(12) United States Patent
Schütz et al.

(10) Patent No.: US 8,828,530 B2
(45) Date of Patent: Sep. 9, 2014

(54) HEAT-STORING MOLDINGS

(75) Inventors: Angelo Schütz, Rudolstadt (DE); Stefan Reinemann, Rudolstadt (DE)

(73) Assignee: Thueringisches Institut fuer Textil-und Kunststoff-Forschung E.V., Rudolstadt (DE)

( * ) Notice: Subject to any disclaimer, the term of this patent is extended or adjusted under 35 U.S.C. 154(b) by 488 days.

(21) Appl. No.: 13/319,562

(22) PCT Filed: Feb. 1, 2011

(86) PCT No.: PCT/EP2011/000450
§ 371 (c)(1),
(2), (4) Date: Dec. 14, 2011

(87) PCT Pub. No.: WO2011/098225
PCT Pub. Date: Aug. 18, 2011

(65) Prior Publication Data
US 2012/0064327 A1 Mar. 15, 2012

(30) Foreign Application Priority Data

Feb. 9, 2010 (DE) .................. 10 2010 007 497

(51) Int. Cl.
| | | |
|---|---|---|
| *D02G 3/02* | (2006.01) | |
| *B29C 47/88* | (2006.01) | |
| *B32B 27/32* | (2006.01) | |
| *D01D 5/088* | (2006.01) | |
| *D01F 6/56* | (2006.01) | |
| *B29C 47/00* | (2006.01) | |
| *C09K 5/06* | (2006.01) | |
| *D01F 1/10* | (2006.01) | |
| *B29K 25/00* | (2006.01) | |
| *B29K 33/00* | (2006.01) | |
| *B29K 23/00* | (2006.01) | |
| *B29K 69/00* | (2006.01) | |
| *B29K 105/00* | (2006.01) | |

(52) U.S. Cl.
CPC ................ *D01F 1/10* (2013.01); *D01D 5/0885* (2013.01); *B29K 2025/00* (2013.01); *B29K 2033/12* (2013.01); *B29C 2947/92447* (2013.01); *B29C 47/8815* (2013.01); *D01F 6/56* (2013.01); *B29C 47/0021* (2013.01); *B29C 2947/92152* (2013.01); *B29K 2023/0633* (2013.01); *B29K 2023/065* (2013.01); *B29K 2069/00* (2013.01); *B29C 2947/92209* (2013.01); *C09K 5/063* (2013.01); *B29K 2105/256* (2013.01)
USPC ....... 428/220; 428/401; 428/367; 264/211.12

(58) Field of Classification Search
None
See application file for complete search history.

(56) References Cited

U.S. PATENT DOCUMENTS

| | | | |
|---|---|---|---|
| 4,737,537 | A | 4/1988 | Schwabe et al. |
| 4,908,166 | A | 3/1990 | Salyer |

(Continued)

FOREIGN PATENT DOCUMENTS

| | | |
|---|---|---|
| DE | 10 2008 015 782 A1 | 4/1995 |
| DE | 43 36 097 A1 | 4/1995 |

(Continued)

*Primary Examiner* — David Sample
*Assistant Examiner* — Nicole T Gugliotta
(74) *Attorney, Agent, or Firm* — ProPat, L.L.C.

(57) ABSTRACT

Fiber-like or film-like moldings are produced from a plastified mixture which, based on its weight, is from 60 to 10% by weight of a carrier component and from 40 to 90% by weight of a phase change material. The carrier component contains from 5 to 20% by weight of a polymer or polymer blend from the group of LDPE (low density polyethylene), HDPE (high density polyethylene), PMMA (polymethyl methacrylate), polycarbonate, or mixtures thereof, from 5 to 20% by weight of a styrene block copolymer, and from 0 to 20% by weight of one or more additives. Especially suitable phase change materials include natural and synthetic paraffins, polyethylene glycol (=polyethylene oxide), and mixtures thereof. The plasticized mixture is extruded through a spinneret or a slit die at a temperature of from 130 to 220° C. and is stretched.

24 Claims, 2 Drawing Sheets

(56) References Cited

U.S. PATENT DOCUMENTS

| | | |
|---|---|---|
| 5,885,475 A | 3/1999 | Salyer |
| 2002/0105108 A1 | 8/2002 | Hartmann et al. |
| 2003/0035951 A1 | 2/2003 | Magill et al. |
| 2007/0089276 A1 | 4/2007 | Dugan et al. |
| 2011/0193008 A1* | 8/2011 | Fieback et al. ............ 252/67 |

FOREIGN PATENT DOCUMENTS

| | | |
|---|---|---|
| WO | WO 01/35511 A2 | 5/2001 |
| WO | WO 2009/118344 A1 | 10/2009 |

* cited by examiner

HEAT-STORING MOLDINGS

CROSS-REFERENCE TO RELATED APPLICATIONS

This application is being filed under Rule 1.371 as a National Stage Application of pending International Application No. PCT/EP2011/000450 filed Feb. 1, 2011, which claims priority to parent application German Patent Application No. 10 2010 007 497.7, filed Feb. 9, 2010. Both International Application Nos. PCT/EP2011/000450 and German Patent Application No. 10 2010 007 497.7 are hereby incorporated by reference herein in their entirety.

FIELD OF THE INVENTION

The present invention relates to fibrous or foil-like moldings with high heat storage capacity.

BACKGROUND OF THE INVENTION

The present invention relates to a process for producing fibrous or foil-like moldings made of a plastified mixture which is composed, based on its weight, of from 60 to 10% by weight of a carrier component and from 40 to 90% by weight of a phase change material, where, based on the weight of the plastified mixture, the carrier component comprises from 5 to 20% by weight of a polymer or polymer blend from the group of LDPE (low-density polyethylene), HDPE (high-density polyethylene), PMMA (polymethyl methacrylate), polycarbonate, and mixtures thereof, from 5 to 20% by weight of a styrene block copolymer, and from 0 to 20% by weight of one or more additives, and the phase change material has been selected from the group consisting of natural and synthetic paraffins, polyethylene glycol (=polyethylene oxide), long-chain dialkyl ethers, long-chain alkyl alcohols, low-molecular-weight highly crystalline PE waxes, and mixtures thereof, and the plastified mixture is extruded at a temperature of from 130 to 220° C. through an extrusion die to give fibrous or foil-like moldings.

The invention further relates to a fibrous or foil-like molding which, based on its weight, is composed of from 60 to 10% by weight of a carrier component and from 40 to 90% by weight of a phase change material, where, based on the weight of the molding, the carrier component comprises from 5 to 20% by weight of a polymer or polymer blend from the group of LDPE, HDPE, PMMA, polycarbonate, and mixtures thereof, from 5 to 20% by weight of a styrene block copolymer, and from 0 to 20% by weight of one or more additives, and the phase change material has been selected from the group consisting of natural and synthetic paraffins, polyethylene glycol, and mixtures thereof.

At the phase transition temperature of the phase change material (hereinafter abbreviated to PCM), the heat storage enthalpy of the fibers or foils of the invention (hereinafter also termed PCM fibers and, respectively, foils) is up to 230 J/g. The fibers or foils are suitable for producing textile and sheet materials, to which they give advantageous thermal properties. The PCM fibers/foils provide compensation for temperature changes by absorbing or emitting heat, by virtue of their high heat storage enthalpy. Textile materials that can be used are especially textile clothing composites, wovens and knits with other synthetic or natural textile fibers, and also engineering textiles and engineering textile composites. The PCM fibers of the invention can also be processed to give chopped PCM fibers or PCM staple fibers, these likewise being used in textile applications (thermally insulated apparel, engineering textiles).

The prior art discloses blends made of phase change materials (PCM) and of polymeric thermoplastic carrier components, such as polyethylene and polypropylene, and moldings produced therefrom. Relevant patent specifications describe inter alia the production of fibers by means of conventional melt spinning processes. Blends made of one or more PCMs and of a polymeric carrier component are hereinafter termed PCM-polymer compounds.

PCMs used preferably comprise paraffins, or else long-chain dialkyl ethers, long-chain alkyl alcohols, or low-molecular-weight, highly crystalline PE waxes. A fundamental problem with the use of paraffin is that it is subject to severe heating during the plastification or melting process and, after discharge from an extrusion die with the attendant pressure drop, it vaporizes and forms bubbles. The formation of bubbles causes defects in the extruded molding. In the case of melt spinning of fibers, this leads to break-off or filament fracture. It is moreover known that moldings produced from PCM-polymer compounds, for example pellets, foils, sheets, etc. liberate liquefied PCM (preferably paraffin) when the phase transition temperature is exceeded. This process is also termed "sweating" in technical circles and is attributable to PCM residing close to the surface. PCMs such as paraffins have poor or zero miscibility with a wide variety of polymers. However, by using plastification and/or melting and mechanical shear it is possible to emulsify paraffin in a polymeric carrier component. Within this type of melt emulsion, the paraffin takes the form of droplet-like inclusions or droplet-like domains. The PCM droplets or paraffin droplets are also found in the moldings produced from the melt. If the surface of the molding has defects resulting from production or use, for example cracks or fractures, liquefied PCM can escape from droplets located immediately below the surface when the phase change temperature is exceeded, and can be emitted into the environment.

U.S. Pat. No. 5,885,475 describes the production of melt-spun polyolefin fibers which comprise, as phase change material, up to 60% by weight of unencapsulated crystalline hydrocarbons, such as paraffin. In order to bind the paraffin within the fiber and prevent sweating, a proportion by weight of from 7 to 16% by weight of silica particles is added to the melt or to the blend.

U.S. Pat. No. 4,737,537 and U.S. Pat. No. 4,908,166 relate to the production of chemically crosslinked PCM-polyethylene compounds, with the aim of achieving higher fill levels of PCM component in the polymer matrix. However, these chemically crosslinked PCM-polyethylene compounds are unsuitable for fiber production by means of conventional melt spinning processes, since the crosslinking begins to occur before the plastification/melting process has ended, and the associated viscosity increase inevitably reduces the spinning rate to a value which is not of any economic use.

DE 43 36 097 A1 (whose United States equivalents are U.S. Pat. Nos. 5,518,670 and 5,785,997) discloses a process for producing monofils made of filament-forming polymers via melt spinning. Filament-forming polymers mentioned are inter alia polyamides, polyesters, polyethylene, polypropylene, and polyacrylonitrile. Directly after discharge from the spinneret head, the monofils can be treated with blown air and cooled. They then pass through a liquid bath, the temperature of which is in the range from −10 to +150° C. This process is not very suitable for producing PCM-containing polymer fibers, because in the hot, thermoplastic state these have practically no tensile strength, and because of this they can immediately break off from the spinneret die under their own weight.

There are also processes known as bicomponent melt spinning processes, in which the extrusion die has two zones, so that a fiber is extruded with two filaments or regions spatially delineated from one another and made of different materials. US 2003/0035951 A1 and US 2007/0089276 A1 disclose processes of this type. Bicomponent fibers have by way of example a cross section of core-shell type or of multifilament (island-in-sea) type, where the core or the filaments is/are composed of a PCM and the sheath or the surrounding matrix is composed of a thermoplastic polymer. Bicomponent melt spinning processes have proven not to be very suitable for producing heat-storing, PCM-containing fibers. The extrusion heads required for this purpose have complex geometry and are susceptible to die blockage. This problem is intensified by the bubble formation described above and the attendant fiber break-offs, the residues from which cause caking at the spinneret dies. There is therefore a restriction on the proportion of PCM in the fiber in bicomponent fibers, to low values around 30% by weight. There is a corresponding restriction on the heat storage capacity achievable with bicomponent fibers.

One known method for avoiding the above problems is based on the use of PCM microcapsules in which there is a polymer envelope enclosing the PCM. The PCM microcapsules are incorporated into the carrier component in an upstream process step, preferably by means of an extruder. The plastified blend made of carrier component and of PCM microcapsules is extruded to give a strand and pelletized. The resultant pellets serve as starting material for the melt spinning process to give the fiber. Again, with this method there is a restriction on the quantitative proportion of the PCM in the pellets and therefore in the fiber, to values around 30% by weight. In order to incorporate more PCM into the fiber, it would be necessary to increase the amount, and therefore the density, of PCM microcapsules within the pellets to a value at which the intensive shear in the extruder causes increased destruction of the PCM microcapsules and liberation of PCM. The associated disadvantageous effects, such as bubble formation, have been described above.

US 2002/0105108 uses nylon-6-encapsulated PCM in polyethylene as carrier matrix, the proportion of PCM in the fiber being at most 30% by weight.

Other PCM-polymer compounds have been developed which are suitable for producing relatively substantial moldings. WO 2009/118344 A1 (=DE 10 2008 015 782) (and whose United States equivalent is United States Patent Publication No. 2011/193008) discloses a process for producing a thermoplastic material with heat storage enthalpy up to 135 J/g. The thermoplastic material includes a phase change material, in particular paraffin, and, as carrier component, a blend made of PMMA and of styrene block copolymers. The thermoplastic material is used to produce strand-extruded pellets. Production of fibers from the thermoplastic material is also provided, but without disclosure of any specific extrusion process for this purpose. The pellets of WO 2009/118344 A1 liberate practically no paraffin during extraction tests using cyclic temperature changes. From electron micrographs of cryofractured pellets it can be seen that the paraffin has been included in the form of droplet-like domains in the carrier component. The diameter of the paraffin domains is in the range from 10 to 100 μm.

Starting from the PCM-polymer compounds described in WO 2009/118344 A1 and from the processes for producing the same, the inventors have attempted to produce melt-spun fibers and extruded foils with from 40 to 75% by weight paraffin content and with fineness in the range from 5 to 70 tex and, respectively, with thickness of from 100 to 1000 μm. The problems that arose here were as follows:

numerous break-offs of the fiber/foil (in particular during orientation)

low breaking force of less than 3 cN/tex and, respectively, less than 30 N/mm$^2$ a) high sweating losses.

Said problems are believed to be attributable to the disadvantageous surface:volume ratio (~1/radius and, respectively, ~1/thickness) of fibers/foils. Fineness of from 5 to 70 tex corresponds to a fiber diameter of about 80 to 300 μm. According to the studies described in WO 2009/118344 A1 on strand-extruded pellets, the dimensions of the paraffin domains are in the range from 10 to 100 μm. Because the size of the paraffin domains is considerable in relation to the fiber diameter, and the fill levels are high, up to 75% by weight, it is highly probable that there are paraffin domains immediately adjacent to the fiber surface, which is large in relation to the fiber volume.

Small defects produced during spinning and orientation within the fiber surface can therefore lead to considerable paraffin losses and attendant structural weakening of the fiber, and to sweating. Similar problems arose in the production of extruded foils with thicknesses in the region below 1000 μm.

SUMMARY OF ADVANTAGEOUS EMBODIMENTS OF THE INVENTION

The object of the present invention accordingly consists in overcoming the problems associated with the prior art and providing a process for producing fibrous or foil-like moldings with high heat storage capacity which are suitable for textile applications.

DETAILED DESCRIPTION OF ADVANTAGEOUS EMBODIMENTS OF THE INVENTION

Figure 1:
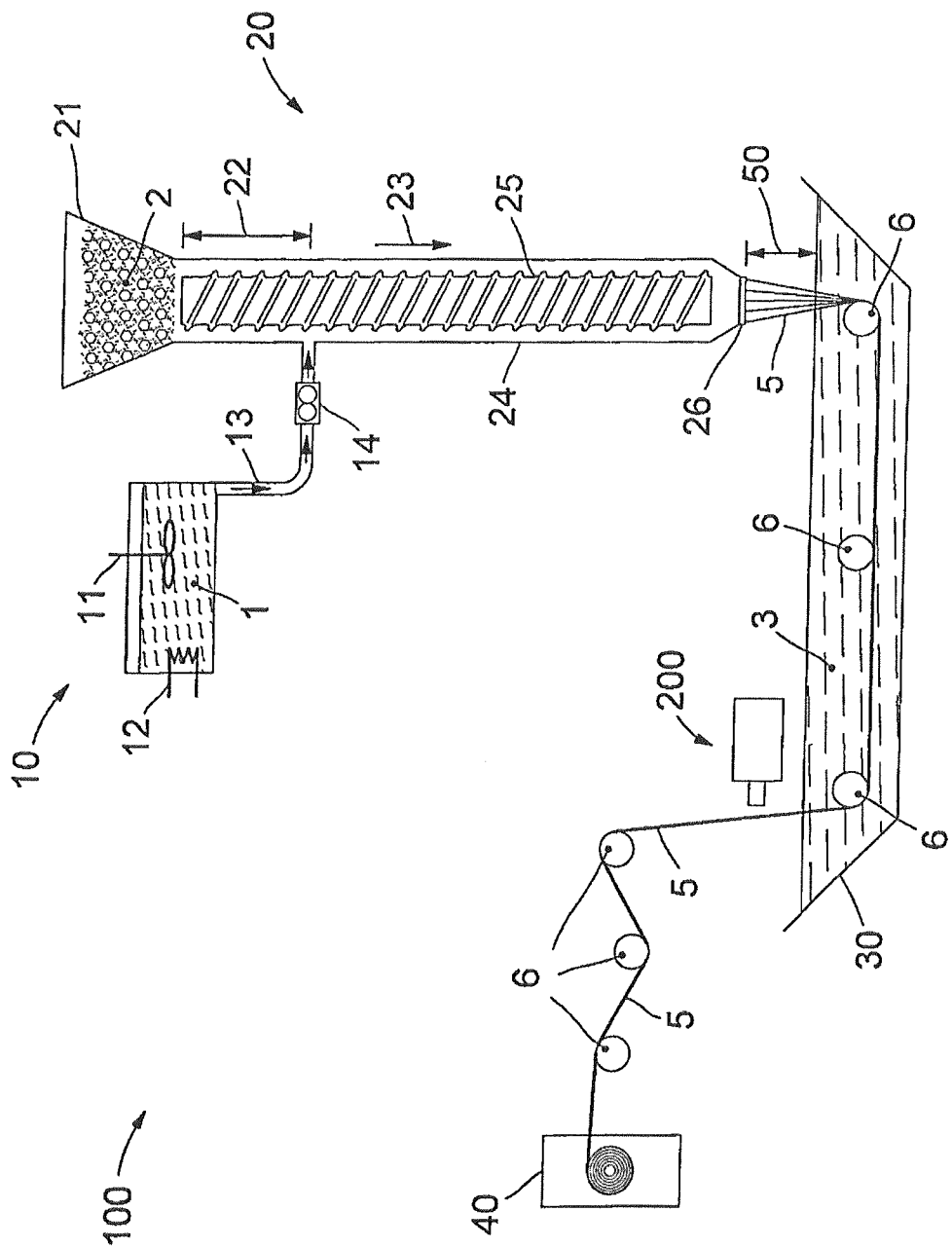
FIG. 1 is a schematic illustration of an exemplary device for spinning fibers or extruding foils in accordance with the invention.

Said object is achieved via a process in which a plastified mixture is provided which is composed, based on its weight, of from 60 to 10% by weight of a carrier component and from 40 to 90% by weight of a phase change material, where, based on the weight of the plastified mixture, the carrier component comprises from 5 to 20% by weight of a polymer or polymer blend from the group of LDPE, HDPE, PMMA, polycarbonate, and mixtures thereof, from 5 to 20% by weight of a styrene block copolymer, and from 0 to 20% by weight of one or more additives, and the phase change material has been selected from the group consisting of natural and synthetic paraffins, long-chain dialkyl ethers, long-chain alkyl alcohols, low-molecular-weight highly crystalline PE waxes, polyethylene glycol, and mixtures thereof, and the plastified mixture is extruded at a temperature of from 130 to 220° C. through an extrusion die to give fibrous or foil-like moldings, characterized in that, within a period of from 0.05 to 4 s after discharge from the extrusion die, the moldings are quenched to a temperature in the range from 10 to 80° C.

In one preferred embodiment, the plastified mixture is composed of from 60 to 25% by weight of a carrier component and from 40 to 75% by weight of a phase change material.

The process of the invention preferably uses amorphous polymers, such as SEBS, SEEPS, and PMMA, as carrier component, and/or as styrene block copolymer. These exhibit no melting point, but instead only a glass transition temperature. As temperature increases, they become ever softer and less viscous, and as temperature decreases they become correspondingly more viscous and harder. The temperature of the extrusion die can therefore be approximately the same as or indeed somewhat lower than (i.e. lower by about 10 to 20° C. than) the temperature in the final zone of the spinning extruder or of the spinning pump. When crystalline polymers are used, in contrast, the die temperature has to be higher than the melting point of the polymers, otherwise the spinneret die would immediately become blocked.

Embodiments of the process of the invention are characterized in that:
- the moldings are quenched to a temperature in the range from 10 to 50° C., preferably from 15 to 40° C., and in particular from 15 to 25° C.;
- the plastified mixture made of carrier component and phase change material is extruded at a temperature of from 160 to 200° C.;
- the moldings are quenched at an average cooling rate of from 60 to 600 K/s, preferably from 80 to 300 K/s, and in particular from 120 to 200 K/s;
- the carrier component is charged in the form of powder blend of grain size smaller than/equal to 2 mm and is mixed and plastified in a plastifying device; and the phase change material is introduced in liquid form at a temperature in the range from 50 to 130° C. to the plastifying device and is mixed with the plastified carrier component during a period of from 2.5 to 10 min;
- for the quenching process, the moldings are treated with a coolant fluid, and in particular the moldings are passed through a water bath which optionally comprises surfactants at a concentration of from 0.1 to 3 g/l;
- after discharge from the extrusion die and prior to quenching, the moldings are passed through an air gap of length from 0.5 to 10 cm, preferably from 1 to 5 cm;
- the moldings are drawn off from the extrusion die at a velocity of from 5 to 50 m/min, preferably from 10 to 30 m/min;
- after discharge from the extrusion die, the moldings are oriented with a stretching factor of from 1.1 to 2; and
- the moldings are subjected to a subsequent orientation process with a stretching factor of from 2 to 12.

It is not necessary to add the PCM material in liquid form. It can also be added in solid form. A high extruder screw fill level in the intake region is always advantageous. High shear forces are thus achieved, with resultant increased uniformity of distribution of the PCM domains.

By using a heated spinneret die which has good thermal insulation, it is also possible to spin the melt filaments directly into the cooling bath, in particular into the water bath. Use of this method can give a wet spinning process. The die here advantageously protrudes into the cooling bath to an extent of about 1 to 20 mm. The die temperature is advantageously lowered to about 70 to 100° C., and the cooling bath temperature is advantageously raised to about 40 to 60° C. There is a corresponding increase in the pressure of the melt. An advantage of this procedure is even faster quenching of the low-viscosity PCM-containing melt filaments. The coolant liquid also causes flotation of the filaments, and they therefore do not break off so easily under their own weight.

In one particular embodiment, the cooling bath, i.e. in particular the water bath, comprises postcrosslinking polysiloxanes which hydrophobize the surface of the moldings, preferably amino-modified polysiloxanes. This measure can inhibit conglutination of the thin spun filaments on entry into the cooling bath.

Another object of the present invention consists in providing fibrous or foil-like moldings which have high heat storage capacity and which are suitable for textile applications.

Said object is achieved via a molding which, based on its weight, is composed of from 60 to 10% by weight of a carrier component and from 40 to 90% by weight of a phase change material, where, based on the weight of the molding, the carrier component comprises from 5 to 20% by weight of a polymer or polymer blend from the group of LDPE, HDPE, PMMA, polycarbonate, and mixtures thereof, from 5 to 20% by weight of a styrene block copolymer, and from 0 to 20% by weight of one or more additives, and the phase change material has been selected from the group consisting of natural and synthetic paraffins, polyethylene glycol, and mixtures thereof, characterized in that the molding is a fiber of fineness from 5 to 70 tex, with residual elongation from 5 to 100%, and with breaking force per unit of fineness of from 7 to 15 cN/tex, or a foil of thickness from 100 to 1000 μm, with residual elongation of from 10 to 100%, and with ultimate tensile strength of from 50 to 200 N/mm$^2$ and heat capacity at the phase transition temperature of the phase change material is from 70 to 270 J/g.

Embodiments of the moldings of the invention are characterized in that:
- they are composed of, based on their weight, from 60 to 10% by weight of a carrier component and from 40 to 90% by weight of a phase change material;
- the phase transition temperature of the phase change material is in the range from 30 to +135° C., preferably from −30 to +85° C.;
- the styrene block copolymer is a di- or triblock copolymer and encompasses a first and second polymeric component A and B and optionally a third polymeric component C, where A is styrene and B and C have been selected from ethylene, butadiene, butylene, isoprene, and propylene;
- the styrene block copolymer has been selected from SB (styrene-butadiene), SBS (styrene-butadiene-styrene), SIS (styrene-isoprene-styrene), SEBS (styrene-ethylene-butylene-styrene), SEPS (styrene-ethylene-propylene-styrene), and SEEPS (styrene-poly(isoprene-butadiene)-styrene);
- the molding comprises, as additive, a nanoscale material, in particular carbon nanotubes; and
- the molding has been produced by a process as claimed in claims 1 to 10.

PCM materials used can also comprise dialkyl ethers, instead of or else in addition to the paraffins mentioned. These often exhibit particularly high heat capacity in the range from 120 to 300 J/g. The processibility of the dialkyl ethers is just as good as that of paraffins. However, it is also possible to use long-chain alkyl alcohols and low-molecular-weight, highly crystalline PE waxes.

In the invention, the expression "nanoscale material" encompasses an additive which takes the form of a powder, of a dispersion, or of a polymer blend, and which comprises particles having at least one dimension, in particular thickness or diameter, smaller than 100 nm.

Nanoscale materials or nanoscale composites that can be used are therefore lipophilic lamellar minerals, e.g. phyllosilicates and Bentone, where these exfoliate during plastification of the spinning composition. Nanocomposites of this type are supplied by way of example by Nanocor Corp. (AMCOL International Corp.) or in the case of carbon nanotubes by Nanocyl S.A.

Figures and examples are used below for further explanation of the invention.

FIG. 1 shows a device 100 for spinning fibers or for extruding foils by the process of the invention. The device 100 encompasses an extruder 20 with feed vessels 10 and 21 for phase change material (PCM) 1 and, respectively, polymeric carrier component 2, and with an extrusion die 26 designed as spinneret die or as slot die. The arrangement of the extruder 20 shown in FIG. 1 is vertical. The vertical arrangement of the extruder 20 has practical advantages, but is not essential. As an alternative, it is possible to use a horizontally arranged extruder with an angled transition section leading to the extrusion die 26 with deflection of, for example, 40° to 90°. Twin-screw extruders are particularly suitable as extruder 20. The feed vessel 10 advantageously has a heating system 12 and a stirrer 11, in order to liquefy and homogenize the PCM 1, which is preferably paraffin. A line 13 and a metering device, in particular a liquid metering pump 14, connect the feed vessel 10 to the extruder chamber 24. Carrier component 2 generally takes the form of pellets of a blend or takes the form of a mixture of pellets made of a styrene block copolymer and of a polymer or polymer blend from the group of LDPE, HDPE, PMMA, polycarbonate, and mixtures thereof. The feed vessel 21 can moreover comprise additives, such as a nanoscale material, in particular carbon nanotubes. Instead of just one feed vessel 21, there can be two or more feed vessels provided for the individual components of the polymeric carrier component and for the additives.

A direction arrow 23 indicates the direction of flow of the material within the extruder 20 in FIG. 1. The PCM 1 is introduced after carrier component 2 in the direction of flow 23 of the material. The constituents of carrier component 2 are accordingly plastified and mixed in a zone 22, as also are optionally one or more additives, before the PCM 1 is added. It is also possible in the invention to plastify the PCM 1 together with carrier component 2 in the ingoing zone 22. To this end, it is possible to supply the PCM 1 and carrier component 2 from one shared feed vessel 21 or from two separate feed vessels 21 and 10, both connected to the zone 22. This simplified procedure is suitable for PCM 1 with relatively high melting point and viscosity, where liquefied PCM 1 is not subject to any displacement or backpressure which oppose the flow 23 of the material.

The length of the zone 22, based on the total length of the extruder 20, is from 15 to 30%. The conduct of the process is such that the residence time of the melt between the point of introduction of the PCM 1 and the extrusion die 26 is at least 2.5 min. This measure provides thorough mixing of the PCM 1 with carrier component 2. It is advantageous to use a twin-screw extruder 20 in order to promote mixing of the PCM 1 with carrier component 2.

The invention provides intensive mixing of the PCM 1 with polymeric carrier component 2, which is preferably composed of an amorphous styrene block copolymer which has affinity for PCM, e.g. SEBS, SBS, SEPS, SEPS, EPR, and of another, in particular amorphous, polymer, such as PMMA, and which comprises the optionally inorganic additives. It is preferable to use a twin-screw extruder for this purpose. Polymeric carrier component 2 forms a three-dimensional network structure which retains the PCM 1 within the PCM-polymer compound. The network structure is stabilized by the amorphous polymer, in particular by PMMA. The polymer has an advantageous effect on the morphology and strength of the filaments/foil 5 obtained during the melt spinning or extrusion process. The same applies to additives such as multiwall carbon nanotubes. Addition of PMMA and optionally of multiwall carbon nanotubes can reduce the number of break-offs and fractures of the filaments/foil and can increase the yield of the melt spinning process or of the foil extrusion process. If polymeric carrier component 2 is composed solely of styrene block copolymer, the strength of the filaments/foil 5 emerging from the extrusion die 26 is so low that continuous take-off of spun material or of foil becomes impossible (see comparative example 2). PMMA or other polymers, such as LDPE, HDPE, or polycarbonate, become embedded relatively homogeneously into the three-dimensional network structure of the styrene block copolymer during the plastification/melting process, and retard the liberation of paraffin. This effect is believed to be attributable to some extent to the fact that the PMMA solidifies more rapidly than the paraffin and the styrene block copolymer after discharge of the melt from the extrusion die. The solidified PMMA reduces the freedom of motion of the liquefied paraffin and stabilizes the melt filament or the foil.

The melt is extruded in the form of filaments 5 or of a foil by way of the extrusion die 26. The filaments/foil 5 are taken off via a trough 30 comprising a coolant fluid 3. The coolant fluid 3 is preferably water or a mixture of water with an antifreeze, such as ethylene glycol. There is optionally a surfactant admixed with the coolant fluid 3 in order firstly to improve the wetting of the filaments/foil 5 and therefore the heat transfer or the cooling, and secondly to reduce the adhesion of the filaments/foil to take-off rolls or to deflector rolls and to reduce conglutination of the filaments. The coolant fluid 3 is kept at a temperature in the range from −30 to +60° C. by means of a temperature-controlled device. Prior to immersion in the coolant fluid 3, the filaments/foil 5 pass through an air gap 50, which insulates the hot extrusion die 26 thermally from the coolant fluid 3. The fill level, or the volume, of the coolant fluid 3 has been selected in such a way that the length of the air gap 50 is from 0.5 to 10 cm.

In one advantageous embodiment of the invention, a cooled gas, such as cooled nitrogen, is used as coolant fluid for quenching of the filaments/foil 5. For this, the filaments 5 are conducted through a tubular duct attached to a container comprising liquid nitrogen by way of a line equipped with a metering device. The cooling rate of the filaments 5 is controlled via the length of the tubular duct and in particular via the flow rate of the nitrogen introduced into the tubular duct. Care has to be taken here that the gas flow within the duct is laminar, and to avoid turbulence, where this can exert transverse forces on the filaments 5 and cause break-off. For nitrogen-cooling of a foil, this is conducted past a slot-shaped outlet connected to the container comprising liquid nitrogen by way of a line equipped with a metering device.

Take-off of the filaments/foil 5 from the extrusion die 26 is achieved by means of a winder device 40, where the filaments/foil 5 are conducted by way of deflector rolls 6 on their way from the extrusion die 26 to the winder device 40. The take-off speed, i.e. the rotation rate of the winder reel or winder roll (revolutions per minute) is adjusted to a value at which the filaments/foil 5 are oriented with a stretching factor of from 1.1 to 2. In order to adjust or calibrate the rotation rate, the average diameter of the filaments/foil 5 is determined by means of known optical measurement devices firstly after discharge from the extrusion die 26 and secondly prior to the winder device 40. By way of example, the optical measurement device encompasses a laser light source with a linear beam profile oriented perpendicularly with respect to the filament axis, and a digital camera with a CCD sensor. The shadow caused by the filaments 5 in the linear beam profile serves as a measure of filament diameter or filament radius r. If r decreases by an amount Δr, retention of volume requires that the filament has to lengthen by an amount of Δl. On the assumption that the filaments 5 are cylindrical, the following relationship is obtained for the change in length or the stretching factor (l+Δl)/l:

$$\pi \cdot r^2 \cdot l = \pi \cdot (r-\Delta r)^2 \cdot (l+\Delta l) \text{ or}$$

$$(l+\Delta l)/l = r^2/(r-\Delta r)^2$$

The take-off speed, i.e. rotation rate of the winder reel, is calibrated on the basis of this simple relationship and of the thickness change measured optically for the filaments 5.

Film thickness is measured by using a commercially available laser micrometer which utilizes optical attenuation as measured signal.

Figure 2:
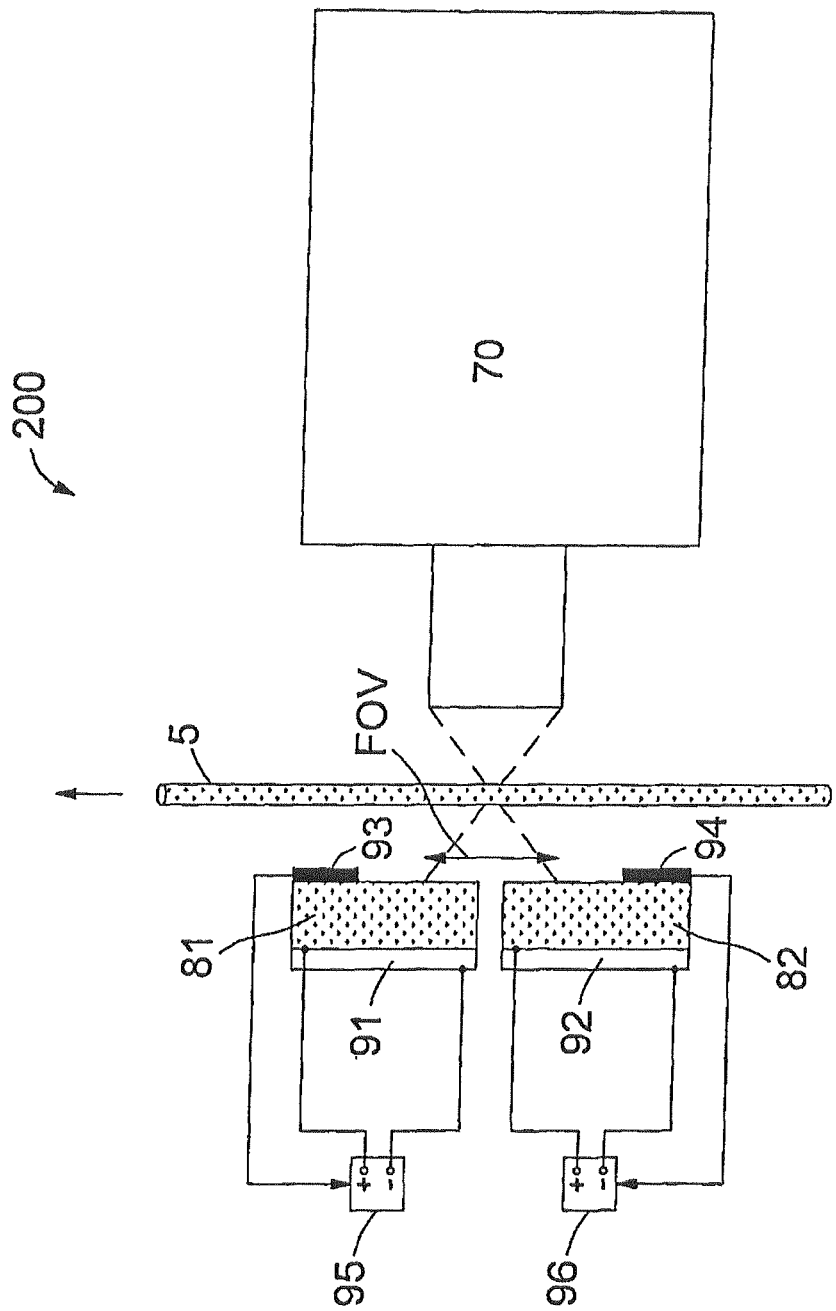
FIG. 2 is schematic illustration of an exemplary thermographic measurement device for determining the temperature of the inventive filaments/foil after quenching.

FIG. 1 also shows a thermographic measurement device 200 for determining the temperature of the filaments/foil 5 after quenching. The structure of the measurement device 200 is explained in more detail below in conjunction with FIG. 2.

In a further process stage not shown in FIG. 1, the filaments/foil 5 are subsequently oriented with a stretching factor of from 2 to 12 (stretching ratio from 200 to 1200%).

The fineness of the subsequently oriented spun filaments is from 5 to 70 tex and their residual elongation is from 5 to 100%. Breaking force per unit of fineness is in the range from 7 to 15 cN/tex.

The thickness of the subsequently oriented foils is from 100 to 1000 μm, their residual elongation is from 10 to 100%, and their ultimate tensile strength is from 50 to 200 N/mm². The residual elongation of the foils in unoriented condition is from 100 to 1000%.

The process of the invention can also produce foils of thickness up to 5000 μm. It is generally also possible to use cooling rolls instead of a coolant fluid to quench foils, in particular those of thickness less than 500 μm. In one advantageous embodiment of the process of the invention, the foils are subsequently calendered by means of calender rolls. The foils of the invention are impermeable to water and water-repellent. Two or more of the foils can be welded to one another. Because the foils have high residual elongation and breaking force, they can be laminated or needled to textiles, to rubber, and to other wovens or knits. The transparency of the foils increases markedly when the temperature is elevated above the phase transition point of the PCM. When the foils are heated, they then shrink by a factor of from 0.1 to 0.8. The foils are practically free from losses due to sweating up to a temperature of 150° C.

One embodiment of the process of the invention encompasses two steps (a) and (b), where step (a) uses a method similar to that described in conjunction with FIG. 1 above to plastify and mix the PCM and polymeric carrier component, and also optionally additives, in a first extruder and to extrude these in the form of strand or of a plurality of strands, and to pelletize the strands by means of a cutter unit. Step (b) uses a second extruder to replastify and remelt the resultant pellets and, as explained above in conjunction with FIG. 1, to spin the material to give filaments or to extrude the material to give a foil, where the filaments or the foil are quenched immediately after discharge from the extrusion die. The two-stage embodiment of the process of the invention allows the melt spinning procedure to be decoupled from the production of the PCM-polymer compound, and allows modification and optimization of the process sequence and material flow so that they are appropriate to logistic requirements.

As mentioned above, the quenching process is essential to the conduct of the melt spinning or foil extrusion process of the invention. If the quenching process is omitted, occurrence of break-offs and fractures of the filaments/foil is so frequent that after less than one minute the extrusion die 26 has become completely blocked. This situation is surprising in view of the fact that after the filaments/foil 5 have been discharged from the spinneret die 26 they first pass through the air gap 50. The length of the air gap 50 is from 0.5 to 10 cm, and the filaments/foil 5 therein emit practically no heat to the environment. Accordingly, the increase in viscosity of the PCM-polymer compound within the air gap is only insignificant, and in particular paraffin continues to be present as low-viscosity liquid or indeed in the vapor phase. Accordingly, fractures and break-offs of the fiber/foil should occur primarily within the air gap 50, and the subsequent quenching process cannot provide anything more than very slight compensation for said problem. However, entirely surprisingly and in contradiction to the above considerations, the quenching process is successful in achieving practically complete elimination of fractures and break-offs of the fiber/foil. The basis for the advantageous effect of the quenching process remains as yet unexplained. However, it is believed that after discharge of the PCM-polymer compound from the extrusion die 26 the liquid paraffin and the carrier polymer demix, whereupon the size of the paraffin domains emulsified within the carrier polymer increases. The quenching process effectively suppresses this relatively rapid demixing, and the size of the paraffin domains is therefore still in essence that of the domains within the melt in the extruder shortly prior to the extrusion die. To the extent that this hypothesis is correct, the paraffin domains in fibers/foil quenched in the invention should be substantially smaller than in substantial moldings which are produced from the PCM-polymer compound without quenching. This would also explain why the fibers/foils of the invention liberate practically no paraffin in sweating tests.

The temperature of the filaments/foil on discharge from the extrusion die is the same as that of the extrusion die, i.e. in the range from 160 to 200° C. In order to determine the quenching or cooling rate (K/s) which is essential to the invention for the filaments/foil, the temperature of the filaments/foil is measured immediately after the quenching process. The measurement device 200 shown in FIG. 2 and based on infrared thermography is used for this purpose. The test method explained for the example of a fiber is applied analogously in the edge region of a foil. The measurement device 200 encompasses an infrared camera 70 (VARIOTHERM® from Jenoptik GmbH with MWIR f/4.4 microscope lens and spectral range from 3.4 to 5 μm) and at least two substantial calibration bodies (81, 82) which have been manufactured from a PCM-polymer compound the same as that of the fiber or the filaments 5 requiring measurement. Thermoelectric Peltier elements (91, 92) are used to keep the calibration bodies (81, 82) at prescribed constant temperatures $T_1$ and $T_2$. Temperature sensors (93, 94) are used to monitor the temperature of each of the calibration bodies (81, 82). The electrical power introduced into the Peltier elements (91, 92) is regulated by means of controllable voltage supplies (95, 96) for which the measurement signal from the Peltier elements (93, 94) is used as input, in such a way as to keep the calibration bodies (81, 82) at the prescribed temperature $T_1$ and $T_2$. $T_1$ and $T_2$ have been selected so as to lie below and above the temperature $T_F$ of the filament 5 requiring measurement, i.e. $T_1 < T_F < T_2$.

Based on the field of view of the infrared camera 70 (abbreviated to FOV), the calibration bodies (81, 82) have been arranged parallel to one another and with thermal insulation from one another via a gap at a distance of about 1 mm behind the filament 5 requiring measurement. The infrared camera 70 has been focused onto the filament 5 and forms an image of this simultaneously with the calibration bodies (81, 82) on the infrared sensor. The measurement device 200 allows measurement of the temperature of the filament 5 with accuracy better than 2 K.

The cooling rate CR is calculated from the difference between the temperature $T_S$ of the spinneret die and the filament temperature $T_F$ after the quenching process, the take-off distance or running distance $I_A$ between the spinneret die and the point of measurement of $T_F$ immediately after the quenching process, and the take-off speed v, by using the following relationship:

$$CR = (T_S - T_F) \cdot v / I_A.$$

The fineness of the fibers or filaments of the invention is measured by the vibration method to DIN EN ISO 1973: 199512, using a Vibroskop 400 (Lenzing Instruments).

The strength or breaking force and residual elongation of the fibers is determined to DIN EN ISO 5079.

The strength or breaking force and residual elongation of foils produced in the invention is determined to DIN EN ISO 527-3 on a foil strip of width 25 mm. For the purposes of the present invention, the breaking force determined to DIN EN ISO 527-3 is stated in the unit [N/mm$^2$] based on the cross-sectional area (=foil width×foil thickness).

In one particular embodiment of the process, with particular design preconditions for the spinneret die and, respectively, for the die orifice duct, in order to ensure correct temperature, it is possible to spin directly into a spinning bath/quenching bath. Said embodiment requires no air gap between the extrusion die and the quenching bath.

The present invention moreover provides use of a nonwoven die in the process as claimed in claims 1 to 10, in order to produce spunbonded nonwovens with a weight per unit area of from 200 to 2000 g/m$^2$. The spunbonded nonwovens of the invention are self-adhesive and have a residual elongation of from 100 to 1000%, and also shrink by a factor of from 0.1 to 0.8 at elevated temperature. The ultimate tensile strength of the individual fibers of the spunbonded nonwovens is from 5 to 15 cN/tex.

EXAMPLES

Inventive examples 1 to 4 below describe in more detail the essential features of the melt spinning process of the invention with subsequent quenching to produce thermoplastic fibers made of PCM-polymer compounds with high heat storage capability.

Inventive Example 1

A ZSE 40 (Leistritz) twin-screw extruder with length:diameter ratio 52:1 was first used to produce pellets made of paraffin, PMMA and SEEPS.

The first two zones (segments 4D and 8D) of the ZSE 40 extruder were heated to temperatures of 250° C. and, respectively, 260° C., in order to melt and mix PMMA and styrene block copolymer (SEPTON® 4055 SEEPS from Kuraray Co. Ltd.). RT 52 paraffin from Rubitherm Technologies GmbH was heated to a temperature of 120° C. in a heatable feed vessel and liquefied, and added to the PMMA/SEEPS melt by way of hermetically sealing metering lances and a metering device (K-TRon weigh feeder with membrane pump). The paraffin was added within the screw zone region (segments 16D to 22D) of the ZSE 40 extruder.

The screw rotation rate and total melt throughput in the ZSE 40 extruder were 800 rpm and 35 kg/h, the resultant average residence time being 2.5 minutes from the paraffin input point (segment 16D to 22D) to the extruder outlet (segment 52D).

An underwater pelletizer (GALA® underwater pelletizer, Gala Inc.) connected by way of an adapter plate to the ZSE 40 extruder was used to pelletize the melt to give pellets of average diameter 4.5 mm.

The starting materials and proportions by weight of the PCM-polymer compound or the pellets were:
- 15% by weight of SEEPS (SEPTON® 4055, Kuraray Co. Ltd.)
- 15% by weight of PMMA (PMMA type 7N uncolored, Evonik AG)
- 70% by weight of PCM (RUBITHERM® RT52, Rubitherm Technologies GmbH).

Process parameters, such as the temperature of the pelletizing die and the rotation rate of the 3-blade cutting head of the underwater pelletizer, were varied in the range from 130 to 210° C. and from 1500 to 3600 rpm, in order to produce various types of pellets with average grain diameter of from 3 to 8 mm.

The heat storage capacity of the resultant pellets at 52.5° C., which is the phase change temperature of the paraffin, was determined by means of DSC (differential scanning calorimetry) as 120 J/g.

The pellets were then spun in a laboratory-scale spinning system (Randcastle ¼ inch miniextruder, Randcastle Inc.) to give filaments of fineness 100 tex (100 g/1000 m), by taking the gel-like melt filaments discharged at 190° C. from a spinneret die with 12 die orifices each of internal diameter 400 μm at a take-off speed of 20 m/min through a water bath controlled to a temperature of 25° C., and, by way of deflector rollers and a take-off system, winding them onto a godet. The pellets made of the PCM-polymer compound were introduced to the Randcastle extruder at constant solids-flow rate by way of a hopper. The jacket of the Randcastle extruder was heated segmentally in such a way as to give three melting zones with temperatures of 80° C., 130° C., and 230° C. from the inlet to the outlet, i.e. in the direction of melt flow. The spinneret die of the Randcastle extruder was maintained at a temperature of 190° C. by means of a heated metal grid. The rotation rate of the extruder screw was 90 rpm.

The fill level of the water in the quenching trough was adjusted to give an air gap of about 3 cm, this being the distance between the discharge area of the die and the surface of the water. The length of the air gap was increased for experimental purposes to about 3.5 cm, whereupon the frequency of filament break-offs multiplied. The frequency of filament break-offs was also reduced only slightly by lowering the take-off speed from 20 m/min to 10 m/min. In contrast to this, if the air gap was only 1 cm, the melt spinning process could be run with practically no filament break-offs at take-off speeds of up to 30 m/min.

In order to improve the wetting, and therefore the cooling, of the hydrophobic filaments, a surfactant was added at a concentration of 1 g/l to the water in the quenching trough. This simultaneously achieved better separation of the 12 filaments. Surprisingly, the filaments spun from the PCM-polymer compound have high residual elongation: almost 1000%.

The spun filaments were then oriented at a temperature of from 25 to 40° C. in an orientation device (Randcastle Inc.) equipped with a heated air unit (heating tubes), using a stretching factor of 1:9. The following textile physics parameters were measured on the oriented fibers/filaments:
fiber fineness: 11 tex
breaking force: 85 cN
breaking force per unit of fineness: 7.8 cN/tex
residual elongation: 85%

A sample weighing 100 g of the oriented fibers was subjected to an extraction test in 1000 ccm of a mixture made of 50% by weight of ethylene glycol and 50% by weight of water. In 60 successive cycles, the ethylene glycol/water/fiber mixture was heated from 30 to 105° C. and then cooled again to 30° C. The duration of each of the heating and cooling cycles was 8 h. A stirrer was used here to keep the ethylene glycol/water/fiber mixture in constant motion.

Once the 60 temperature cycles had ended, the fibers were removed, and a turbidimeter was used to determine the turbidity of the ethylene glycol/water mixture, which was smaller than or equal to 30 NTU. GC/FID (mineral hydrocarbon detection unit) was also used to measure paraffin content, which was 200 ppm.

Inventive Example 2

The method used in inventive example 1 was used to produce pellets made of a PCM-polymer compound constituted as follows:
15% by weight of SEEPS (SEPTON® 4055, Kuraray Co. Ltd.)
15% by weight of PMMA (PMMA type 7N uncolored, Evonik AG)
4% by weight of multiwall carbon nanotubes (NC 7000, Nanocyl S.A.)
66% by weight of PCM (RUBITHERM® RT52, Rubitherm Technologies GmbH).

Process parameters, such as the temperature of the pelletizing die and the rotation rate of the 3-blade cutting head of the underwater pelletizer, were varied in the range from 130 to 210° C. and from 1500 to 3600 rpm, in order to produce various types of pellets with average grain diameter of from 3 to 8 mm.

The heat storage capacity of the resultant pellets at 52.5° C., which is the phase change temperature of the paraffin, was determined by means of DSC (differential scanning calorimetry) as 113 J/g.

The pellets were then spun in a laboratory-scale spinning system (Randcastle ¼ inch miniextruder, Randcastle Inc.) to give filaments of fineness 80 tex (80 g/1000 m), by taking the gel-like melt filaments discharged at 190° C. from a spinneret die with 12 die orifices each of internal diameter 400 µm at a take-off speed of 40 m/min through a water bath controlled to a temperature of 25° C., and, by way of deflector rollers and a take-off system, winding them onto a godet. The pellets made of the PCM-polymer compound were introduced to the Randcastle extruder at constant solids-flow rate by way of a hopper. The jacket of the Randcastle extruder was heated segmentally in such a way as to give three melting zones with temperatures of 80° C., 130° C., and 230° C. from the inlet to the outlet, i.e. in the direction of melt flow. The spinneret die of the Randcastle extruder was maintained at a temperature of 190° C. by means of a metal grid. The rotation rate of the extruder screw was 90 rpm.

The fill level of the water in the quenching trough was adjusted to give an air gap of about 4.5 cm, this being the distance between the discharge area of the die and the surface of the water. The length of the air gap was increased for experimental purposes to about 5 cm, whereupon the frequency of filament break-offs multiplied. The frequency of filament break-offs was also reduced only slightly by lowering the take-off speed from 40 m/min to 10 m/min. In contrast to this, if the air gap was 3 cm, the melt spinning process could be run with practically no filament break-offs at take-off speeds of up to 40 m/min.

In order to improve the wetting, and therefore the cooling, of the hydrophobic filaments, a surfactant was added at a concentration of 1 g/l to the water in the quenching trough. This simultaneously achieved better separation of the 12 filaments. The filaments spun from the PCM-polymer compound had high residual elongation: almost 1000%.

The spun filaments were then oriented at a temperature of from 25 to 40° C. in an orientation device (Randcastle Inc.) equipped with a heated air unit (heating tubes), using a stretching factor of 1:10. The carbon nanotubes present in the PCM-polymer compound raised the strength of the spun filaments considerably and permitted spinning and orientation of very thin filaments. The following textile physics parameters were measured on the oriented fibers/filaments:
fiber fineness: 10 tex
breaking force: 100 cN
breaking force per unit of fineness: 10 cN/tex
residual elongation: 90%

A sample weighing 100 g of the oriented fibers was subjected to an extraction test in 1000 ccm of a mixture made of 50% by weight of ethylene glycol and 50% by weight of water. In 60 successive cycles, the ethylene glycol/water/fiber mixture was heated from 30 to 105° C. and then cooled again to 30° C. The duration of each of the heating and cooling cycles was 8 h. A stirrer was used here to keep the ethylene glycol/water/fiber mixture in constant motion.

Once the 60 temperature cycles had ended, the fibers were removed, and a turbidimeter was used to determine the turbidity of the ethylene glycol/water mixture, which was smaller than or equal to 30 NTU. GC/FID (mineral hydrocarbon detection unit) was also used to measure paraffin content, which was 200 ppm.

Inventive Example 3

A ZSK 25 (Coperion) twin-screw extruder with length: diameter ratio of 40:1 was used to plastify or melt a PCM-polymer compound constituted as follows:
15% by weight of SEEPS (SEPTON® 4055, Kuraray Co. Ltd.)
15% by weight of PMMA (PMMA type 7N uncolored, Evonik AG)
70% by weight of PCM (RUBITHERM® RT52, Rubitherm Technologies GmbH).

For this, the first two zones (segments 4D and 8D) of the ZSK 25 extruder were heated to temperatures of 250° C. and, respectively, 260° C., in order to melt and mix PMMA and styrene block copolymer (SEPTON® 4055 SEEPS from Kuraray Co. Ltd.). RT 52 paraffin from Rubitherm Technologies GmbH was heated to a temperature of 120° C. in a heatable feed vessel and liquefied, and added to the PMMA/SEEPS melt by way of hermetically sealing metering lances and a metering device (K-TRon weigh feeder with membrane pump). The paraffin was added within the screw zone region 12D to 16D of the ZSK 25 extruder.

The screw rotation rate and total melt throughput in the ZSK 25 extruder were 800 rpm and 5 kg/h, the resultant average residence time being 2.5 minutes from the paraffin input point (segment 12D to 16D) to the extruder outlet.

From the outlet of the ZSK 25 extruder, the melt was spun by way of an adapter, a melt spinning pump, a heated deflector head, and a spinneret die with 100 die orifices with internal diameter 400 μm, and also a textile filter, to give filaments of thickness about 150 μm. The temperature of the spinneret die was kept constant at 190° C.

From the spinneret die, the filaments were taken off at a speed of 20 m/min by way of an air gap of length 3 cm and through a water bath controlled to a temperature of 25° C., and wound onto an intermediate reel. The filaments were then oriented at a temperature of 30° C. in an orientation device (Randcastle Inc.) equipped with a heated air unit (heating tubes), using a stretching factor of 1:9.

Inventive Example 4

A ZSE 40 (Leistritz) twin-screw extruder with length:diameter ratio of 52:1 was first used to produce pellets made of a C16 dialkyl ether (di-n-cetyl ether), PMMA, and SEEPS.

The first two zones (segments 4D and 8D) of the ZSE 40 extruder were heated to temperatures of 250° C. and, respectively, 260° C., in order to melt and mix PMMA and styrene block copolymer (SEPTON® 4055 SEEPS from Kuraray Co. Ltd.). Di-n-cetyl ether from Sasol Germany GmbH was heated to a temperature of 120° C. in a heatable feed vessel and liquefied, and added to the PMMA/SEEPS melt by way of hermetically sealing metering lances and a metering device (K-TRon weigh feeder with membrane pump). The dialkyl ether was added within the screw zone region (segments 16D to 22D) of the ZSE 40 extruder.

The screw rotation rate and total melt throughput in the ZSE 40 extruder were 800 rpm and 35 kg/h, the resultant average residence time being 2.5 minutes from the di-n-cetyl ether input point (segment 16D to 22D) to the extruder outlet (segment 52 D).

An underwater pelletizer (GALA® underwater pelletizer, Gala Inc.) connected by way of an adapter plate to the ZSE 40 extruder was used to pelletize the melt to give pellets of average diameter 4.5 mm.

The starting materials and proportions by weight of the PCM-polymer compound or the pellets were:
- 15% by weight of SEEPS (SEPTON® 4055, Kuraray Co. Ltd.)
- 15% by weight of PMMA (PMMA type 7N uncolored, Evonik AG)
- 70% by weight of PCM (di-n-cetyl ether, Sasol Germany GmbH), Process parameters, such as the temperature of the pelletizing die and the rotation rate of the 3-blade cutting head of the underwater pelletizer, were varied in the range from 130 to 210° C. and from 1500 to 3600 rpm, in order to produce various types of pellets with average grain diameter of from 3 to 8 mm.

The heat storage capacity of the resultant pellets at 54° C., which is the phase change temperature of di-n-cetyl ether, was determined by means of DSC (differential scanning calorimetry) as 193 J/g.

The pellets were then spun in a laboratory-scale spinning system (Randcastle ¼ inch miniextruder, Randcastle Inc.) to give filaments of fineness 100 tex (100 g/1000 m), by taking the gel-like melt filaments discharged at from 120 to 130° C. from a spinneret die with 12 die orifices each of internal diameter 400 μm at a take-off speed of 40 m/min through a water bath controlled to a temperature of 5° C., and, by way of deflector rollers and a take-off system, winding them onto a godet. A heated die with cylindrical external insulation was used here and protruded 10 mm into the cooling water bath.

The pellets made of the PCM-polymer compound were introduced to the Randcastle extruder at constant solids-flow rate by way of a hopper. The jacket of the Randcastle extruder was heated segmentally in such a way as to give three melting zones with temperatures of 80° C., 130° C., and 230° C. from the inlet to the outlet, i.e. in the direction of melt flow. The die plate head of the spinneret die of the Randcastle extruder now protruded 10 mm into the cooling water bath, and was kept at an internal temperature of 190° C. by means of a heated metal grid and appropriately designed external insulation. However, the temperature of the PCM melt filaments immediately at the discharge point of the die was already substantially lower at from 120 to 130° C., and this proved to be very advantageous for immediate formation of filaments.

The rotation rate of the extruder screw was 90 rpm.

The slight direct immersion of the spinneret die into the cooling water bath controlled to a temperature of 25° C., 10 mm below the surface of the water, permitted avoidance of individual filament break-offs at an even higher take-off speed up to 50 m/min.

In order to improve the wetting, and therefore the cooling, of the hydrophobic filaments, a surfactant was added at a concentration of 1 g/l to the water in the quenching trough. This simultaneously achieved better separation of the 12 filaments. Surprisingly, the filaments spun from the PCM-polymer compound have high residual elongation: almost 1000%.

The spun filaments were then oriented at a temperature of from 40 to 45° C. in an orientation device (Randcastle Inc.) equipped with a heated air unit (heating tubes), using a stretching factor of 1:9. The following textile physics parameters were measured on the oriented fibers/filaments:
- fiber fineness: 11 tex
- breaking force: 87 cN
- breaking force per unit of fineness: 8.1 cN/tex
- residual elongation: 80%

A sample weighing 100 g of the oriented fibers was subjected to an extraction test in 1000 ccm of a mixture made of 50% by weight of ethylene glycol and 50% by weight of water. In 60 successive cycles, the ethylene glycol/water/fiber mixture was heated from 30 to 105° C. and then cooled again to 30° C. The duration of each of the heating and cooling cycles was 8 h. A stirrer was used here to keep the ethylene glycol/water/fiber mixture in constant motion.

Once the 60 temperature cycles had ended, the fibers were removed, and a turbidimeter was used to determine the turbidity of the ethylene glycol/water mixture, which was smaller than or equal to 30 NTU. GC/FID (mineral hydrocarbon detection unit) was also used to measure di-n-cetyl ether content, which was 120 ppm.

Comparative Example 1

The PCM-polymer compound of inventive example 1 was then used for spinning experiments in which the filaments were quenched by using, instead of a water bath, cooled air blown onto the material in a duct. These experiments failed because of constant filament break-offs. After a length of about 10-15 cm (distance from the spinneret die) had been spun, a number of the 12 filaments taken off from the spinneret die had broken off, and the free ends of the broken-off filaments here adhered to the intact filaments or to the spinneret die, and the melt spinning process therefore had to be terminated after a short time.

Comparative Example 2

An attempt was made to spin fibers by the process of inventive example 3 from a PCM-polymer compound constituted as follows:

30% by weight of SEEPS (SEPTON® 4055, Kuraray Co. Ltd.)

70% by weight of PCM (RUBITHERM® RT52, Rubitherm Technologies GmbH).

These experiments were unsuccessful because of immediate adhesion of the filaments discharged at a temperature of 190° C. from the spinneret die. No significant improvement was achieved even when the temperature of the die was lowered in stages as far as 130° C.

The invention claimed is:

1. A process for producing fibrous or foil-like moldings made of a plastified mixture which is comprised, based on its weight, of from 60 to 10% by weight of a carrier component and from 40 to 90% by weight of a phase change material, the carrier component comprising from 5 to 20% by weight of a polymer or polymer blend from the group of LDPE, HDPE, PMMA, polycarbonate, or mixtures thereof, from 5 to 20% by weight of a styrene block copolymer, and from 0 to 20% by weight of one or more additives, and the phase change material has been selected from the group consisting of natural and synthetic paraffins, long-chain dialkyl ethers, long-chain alkyl alcohols, low-molecular-weight highly crystalline PE waxes, polyethylene glycol, and mixtures thereof, said process comprising extruding the plastified mixture at a temperature of from 130 to 220° C. through an extrusion die to give fibrous or foil-like moldings, and quenching the extruded moldings within a period of from 0.05 to 4 s after discharge from the extrusion die to a temperature in the range from 10 to 80° C.

2. The process as claimed in claim 1, wherein the moldings are quenched to a temperature in the range from 10 to 60° C.

3. The process as claimed in claim 1, wherein the plastified mixture comprised of carrier component and phase change material is extruded at a temperature of from 160 to 200° C.

4. The process as claimed in claim 1, wherein the moldings are quenched at an average cooling rate of from 60 to 600 K/s.

5. The process as claimed in claim 1, said process further comprising charging the carrier component in the form of powder blend with grain size smaller than/equal to 2 mm in a plastifying device and mixing and plastifying the carrier component; and introducing the phase change material in liquid form at a temperature in the range from 50 to 130° C. to the plastifying device and mixing the phase change material with the plastified carrier component during a period of from 2.5 to 10 min.

6. The process as claimed in claim 1, wherein quenching comprises treating the moldings with a coolant fluid.

7. The process as claimed in claim 1, said process further comprising passing the moldings through an air gap after discharge from the extrusion die and prior to quenching, wherein the air gap of length is from 0.5 to 10 cm.

8. The process as claimed in claim 1, wherein the moldings are drawn off from the extrusion die at a velocity of from 5 to 50 m/min.

9. The process as claimed in claim 1, said process further comprising orienting the moldings after discharge from the extrusion die with a stretching factor of from 1.1 to 2.

10. The process as claimed in claim 9, said process further comprising subjecting the moldings to a subsequent orientation with a stretching factor of from 2 to 12.

11. A molding which, based on its weight, comprises from 60 to 10% by weight of a carrier component and from 40 to 90% by weight of a phase change material, where, based on the weight of the molding, the carrier component comprises from 5 to 20% by weight of a polymer or polymer blend from the group of LDPE, HDPE, PMMA, polycarbonate, or mixtures thereof, from 5 to 20% by weight of a styrene block copolymer, and from 0 to 20% by weight of one or more additives, and the phase change material has been selected from the group consisting of natural and synthetic paraffins, polyethylene glycol, and mixtures thereof, wherein the molding is a fiber of fineness from 5 to 70 tex, with residual elongation from 5 to 100%, and with breaking force per unit of fineness of from 7 to 15 cN/tex, or a foil of thickness from 100 to 1000 μm, with residual elongation of from 10 to 100%, and with ultimate tensile strength of from 50 to 200 N/mm$^2$, and its heat capacity at the phase transition temperature of the phase change material is from 70 to 270 J/g.

12. The molding as claimed in claim 11, wherein the phase transition temperature of the phase change material is in the range from 30 to +135° C.

13. The molding as claimed in claim 11, wherein the styrene block copolymer is a di- or triblock copolymer comprising a first and second polymeric component A and B and optionally a third polymeric component C, where A is styrene and B and C have been selected from ethylene, butadiene, butylene, isoprene, and propylene.

14. The molding as claimed in claim 11, wherein the styrene block copolymer has been selected from styrene-butadiene, styrene-butadiene-styrene, styrene-isoprene-styrene, styrene-ethylene-butylene-styrene, styrene-ethylene-propylene-styrene, and styrene-poly(isoprene-butadiene)-styrene.

15. The molding as claimed in claim 11, wherein said molding comprises a nanoscale material as the additive.

16. The molding as claimed in claim 11, wherein said molding has been produced by a process as claimed in claim 1.

17. The process as claimed in claim 2, wherein the moldings are quenched to a temperature in the range from 15 to 40° C.

18. The process as claimed in claim 2, wherein the moldings are quenched to a temperature in the range from 15 to 25° C.

19. The process as claimed in claim 4, wherein the moldings are quenched at an average cooling rate of from 80 to 300 K/s.

20. The process as claimed in claim 4, wherein the moldings are quenched at an average cooling rate of from 120 to 200 K/s.

21. The process as claimed in claim 6, wherein the moldings are passed through a water bath which optionally comprises surfactants at a concentration of from 0.1 to 3 g/l.

22. The process as claimed in claim 7, wherein the air gap length is from 1 to 5 cm.

23. The process as claimed in claim 8, wherein the velocity at which the moldings are drawn off from the extrusion die is from 10 to 30 m/min.

24. The molding as claimed in claim 15, wherein the nanoscale material is carbon nanotubes.

* * * * *